United States Patent
Chollangi et al.

(10) Patent No.: US 10,296,688 B2
(45) Date of Patent: May 21, 2019

(54) PIN-BASED NOISE CHARACTERIZATION FOR SILICON COMPILER

(71) Applicant: ARM Limited, Cambridge (GB)

(72) Inventors: Mouli Rajaram Chollangi, Fremont, CA (US); Hongwei Zhu, San Jose, CA (US); Hemant Joshi, San Ramon, CA (US); Chandan Kumar Rajendran, San Jose, CA (US); Prashant Lokeshwar, San Jose, CA (US); Umang Deepak kumar Doshi, San Jose, CA (US); Neeraj Dogra, Gilroy, CA (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/387,460

(22) Filed: Dec. 21, 2016

(65) Prior Publication Data

US 2018/0173834 A1    Jun. 21, 2018

(51) Int. Cl.
*G06F 17/50* (2006.01)

(52) U.S. Cl.
CPC ...... *G06F 17/5036* (2013.01); *G06F 17/5072* (2013.01); *G06F 2217/12* (2013.01)

(58) Field of Classification Search
CPC .................. G06F 17/5036; G06F 17/5072
USPC .......................................... 716/115
See application file for complete search history.

(56) References Cited

U.S. PATENT DOCUMENTS

| | | | | |
|---|---|---|---|---|
| 7,788,620 B1 * | 8/2010 | Xue | .............. | G06F 17/5072 716/113 |
| 8,707,234 B1 * | 4/2014 | Ye | .............. | G06F 17/5036 716/106 |
| 8,719,752 B1 * | 5/2014 | Ye | .............. | G06F 17/5063 716/102 |
| 2009/0228850 A1 * | 9/2009 | Bhanji | .............. | G06F 17/5031 716/113 |
| 2011/0276933 A1 * | 11/2011 | Banerji | .............. | G06F 17/5031 716/108 |
| 2017/0168105 A1 * | 6/2017 | Kurtz | .............. | G01R 29/26 |

* cited by examiner

*Primary Examiner* — Suchin Parihar
(74) *Attorney, Agent, or Firm* — Pramudji Law Group PLLC; Ari Pramudji

(57) ABSTRACT

A silicon compiler, such as a memory compiler, provides for pin-based noise characterization in a computationally efficient manner. For a given user-provided option set, a silicon compiler provides a noise database for the set of all available memory instances by performing pin-based noise characterization on only a subset of the set of available memory instances.

20 Claims, 5 Drawing Sheets

PIN-BASED NOISE CHARACTERIZATION FOR SILICON COMPILER

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

A silicon compiler is a software tool for designing integrated circuits based upon user-specified inputs. A silicon compiler is indispensable in designing VLSI (Very Large Scale Integration) circuits, and is a component of an EDA (Electronic Design Automation) system. A silicon compiler can generate various circuit views and files, such as a binary file specifying one or more lithography masks for circuit fabrication, a memory CDL (Circuit Design Language) view, a corner independent EDA view (e.g., Verilog), and a corner dependent specific EDA view (e.g., Liberty), to provide a few examples. A silicon compiler and can also help the circuit designer perform various circuit analyses, such as power consumption, timing, and noise characterization. In addition to the user-specified inputs, a silicon compiler can make use of an extraction deck available from a foundry to incorporate process effects in the circuit analyses, for example where the performance of the circuit may be simulated in response to user-specified PVT (Process-Voltage-Temperature) corners.

A memory compiler is a silicon compiler optimized for the design of memory circuits. In response to a user-specified option set, such as the size of the address space and memory, word size, type of memory, memory style, etc., a memory compiler makes available by way of circuit views various memory instances for analysis, characterization, and possible fabrication. In noise characterizing memory instances, a memory compiler creates semi-automatic vectors, runs simulations, collects simulation results, applies curve fitting, gathers curve-fitted data, and creates a noise database. Data validation and checks are performed to ensure that frontend EDA view results are aligned with noise-characterized results. Noise characterization is an important function of a memory compiler, and pin-based noise characterization models, such as the Composite Current Source (CCS) noise model, is available in industry standard modules for silicon compiler software, such as the open-source Liberty model. With decreasing component dimensions and with chip transistor counts in the billions, it is desirable for noise characterization to be rigorous but also computationally efficient in its use of processor time and system memory resources.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

A relatively large set of memory instances can be designed by tiling together many instances of various leaf cells chosen from a cell library. For a given I/O (Input or Output) pin, a subset of this set of memory instances can be identified whereby each memory instance in this subset will share the same leaf cell instance connected to the given I/O pin. Such a subset may be viewed as an equivalence class, where a family of such equivalence classes spans the entire set of memory instances that can be designed. A pin-based noise characterization can be made for a memory instance selected from an equivalence class. For the selected memory instance and I/O pin, a noise model is applied to a first stage of a channel-connected block connected to the I/O pin if the I/O pin is an input pin, or the noise model is applied to a last stage of a channel-connected block connected to the I/O pin if the I/O pin is an output pin. This pin-based noise characterization can be performed for each I/O pin and each equivalence class, resulting in a noise database for the entire set of memory instances, with a significant savings in computational resources.

In the description that follows, the scope of the term "some embodiments" is not to be so limited as to mean more than one embodiment, but rather, the scope may include one embodiment, more than one embodiment, or perhaps all embodiments.

Various embodiments described herein are directed to memory compilers. It is understood that these embodiments are applicable to silicon compilers in general and are not limited to memory circuit design. Computational and resource (e.g., system memory usage) efficiencies in the noise characterization of VLSI circuits, such as for example memory circuits, are described and illustrated within the context of memory circuit design.

Figure 1:
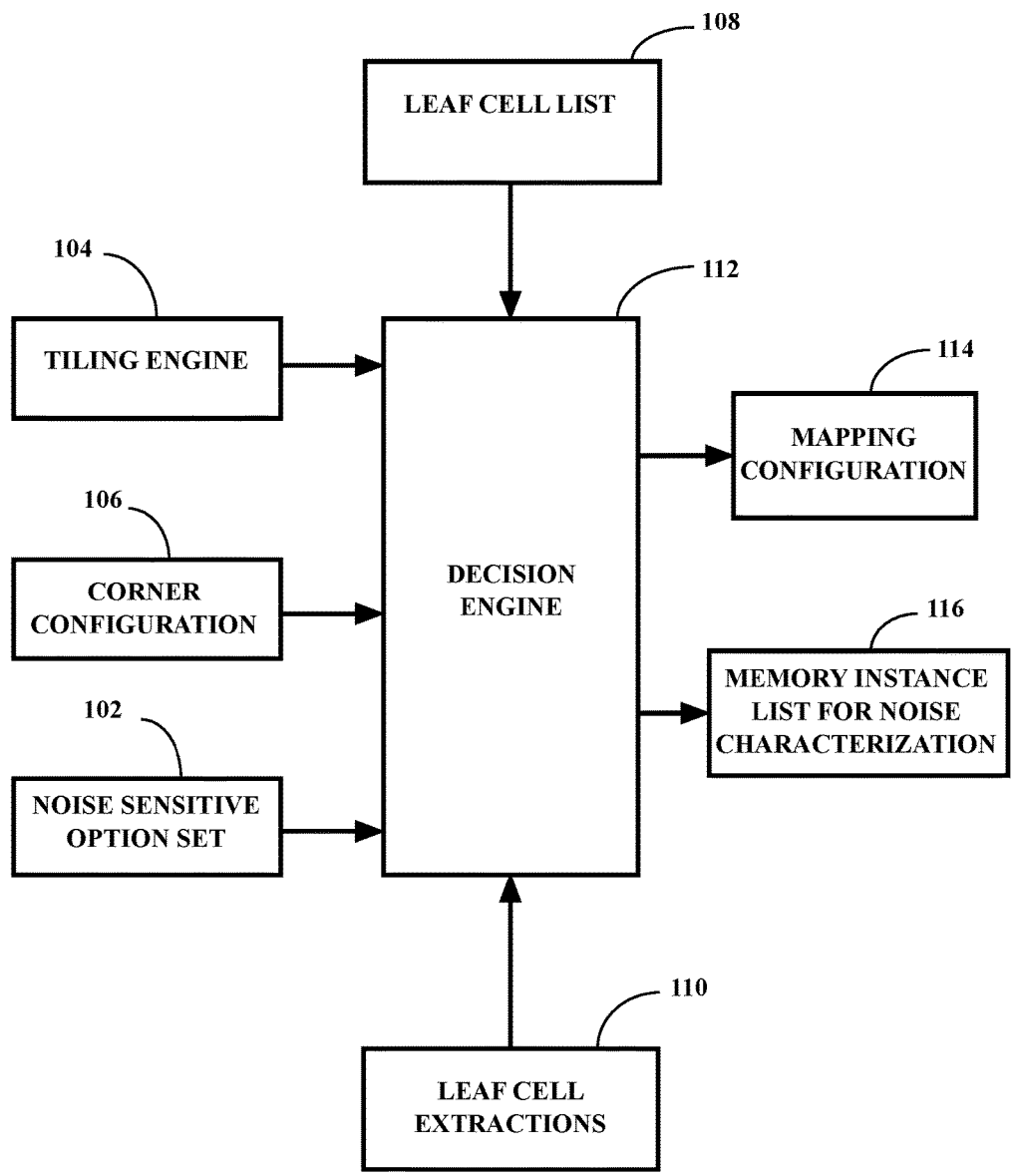
FIG. 1 illustrates a memory compiler architecture according to various embodiments described herein.

FIG. 1 illustrates a memory compiler architecture according to one or more embodiments, where for ease of illustration only a portion of the architecture is illustrated. Based upon a noise sensitive option set 102 provided by a user, a tiling engine 104 tiles together many instances of circuit blocks obtained from a circuit library to synthesize a memory circuit. A leaf cell list 108 provides the circuit library building blocks used by the tiling engine 104. The user provides a corner configuration 106 when using the memory compiler, and a foundry makes available an extraction deck according to their particular process technology, represented by a leaf cell extractions 110.

Based upon input from the noise sensitive option set 102, the tiling engine 104, the corner configuration 106, the leaf cell list 108, and the leaf cell extractions 110, a decision engine 112 provides a mapping configuration 114 and a memory instance list for noise characterization 116. The list of memory instances provided by the memory instance list for noise characterization 116 will in practice be significantly smaller in size than the total number of memory instances that may be synthesized based upon the particular option set provided by the noise sensitive option set 102 and the leaf cells available for synthesis in the leaf cell list 108.

Noise characterization may be performed for the smaller sized list of memory instances and then applied to the other memory instances based on the mapping configuration 114 without the need for curve fitting as is done for some prior art schemes. In this way, all pins may be characterized per EDA requirements.

As will be discussed in more detail, the memory instances provided by the memory instance list for noise characterization 116 in conjunction with the mapping configuration 114 allows for a computationally efficient platform for providing noise characterizations for a memory circuit for various option sets and corner configurations, allowing for full automation of noise characterization for a noise-sensitive compiler option-set by analyzing each pin for each instance for noise parametric information based upon the leaf cells used in tiling. More generally, various implementations described herein may also be applied to other kinds of VLSI circuits in the case of a silicon compiler.

The memory instances provided by the memory instance list for noise characterization 116 will be referred to as base memory instances (or base circuit instances in the case of a silicon compiler). A base memory instance is a memory instance for which results of pin-based noise characterization can be performed and reused for a set of memory instances to which the base memory is mapped or associated. The mapping configuration 114 comprises the mappings (associations).

In particular, the mapping configuration 114 comprises a set of base memory instances and a set of mappings, where each mapping maps (or associates) a base memory instance to a set of memory instances. In general, each mapping is a one-to-many mapping. The set of memory instances to which a particular base memory instance is mapped is a subset of the total set of memory instances. In practice, the subset to which a particular base memory instance is mapped is expected to be a proper subset of the total set of memory instances, and the set of base memory instances is also expected to be a proper subset of the total set of memory instances, although it is not a requirement that such subsets be proper subsets.

The set of mappings are associated with the I/O pins of the memory circuit. In general, there may be more than one mapping associated with an I/O pin. For example, for the case of two mappings associated with some particular I/O pin, there may be associated a first one-to-many mapping and a second one-to-one mapping, where the first one-to-many mapping maps a first base memory instance to a first set of memory instances, and the second one-to-many mapping maps a second base memory instance to a second set of memory instances. In practice, the two sets of memory instances may be disjoint. In this particular example, associated with the particular I/O pin are the two mappings and the set of base memory instances comprising the first and second base memory instances. Other I/O pins may have other associated mappings and base memory instances.

It is to be understood that the mappings described herein can be interpreted as associations. A one-to-many mapping of a base memory instance to a set of memory instances can be viewed as a many-to-one mapping of the set of memory instances to the base memory instance, where in general the one-to-many mapping or the many-to-one mapping each denote an association between the base memory instance and the set of memory instances.

For some given I/O pin, consider an associated mapping that maps a base memory instance to a set of memory instances. The leaf cell instance in the base memory instance to which the I/O pin is connected is the same as the leaf cell instances in the set of memory instances that are connected to the I/O pin. In other words, consider an I/O pin with an associated mapping T that maps a base memory instance $M(0)$ to a set of memory instances $\{M(1), M(2), \ldots, M(K)\}$. The I/O pin is connected to some leaf cell instance L in the base memory instance M. Then, each of the leaf cell instances in the set of memory instances $\{M(1), M(2), \ldots, M(K)\}$ connected to the I/O pin is the same leaf cell instance L.

Continuing with the above example, an alternate viewpoint may be described. A new set of memory instances $\{M(0), M(1), M(2), \ldots, M(K)\}$ obtained by appending the base memory instance $M(0)$ to the set of memory instances $\{M(1), M(2), \ldots, M(K)\}$ can be associated with the I/O pin. Any member (element) of the set $\{M(0), M(1), M(2), \ldots, M(K)\}$ can be used as a base memory instance associated with the I/O pin. The set of memory instances $\{M(0), M(1), M(2), \ldots, M(K)\}$ is an equivalence class. Thus, there is flexibility when choosing a base memory instance for an I/O pin.

Depending upon the noise sensitive option set, there may be more than one distinct equivalence class associated with an I/O pin. Note that for the equivalence class $\{M(0), M(1), M(2), \ldots, M(K)\}$, the subsets $\{M(0), M(1), M(2)\}$ and $\{M(3), M(4), \ldots, M(K)\}$ are each equivalence classes, but not distinct. An embodiment in which each equivalence class associated with an I/O pin is distinct achieves a minimum sized list of base memory instances.

Using the language of equivalence classes, the set of all possible memory instances may be partitioned into distinct equivalence classes. For each I/O pin, there is associated a family of distinct equivalence classes, where the equivalence relation is that each member of an equivalence class is such that the same leaf cell instance is connected to the I/O pin. The memory instance list for noise characterization 116 is a list (data structure) representing base memory instances, where each base memory instance is selected from a distinct equivalence class.

The mapping configuration 114 provides for each I/O pin its associated family of equivalence classes. That is, the mapping configuration 114 provides data structures representing a family of configuration sets, where each configuration set includes (a data structure representative of) a pin and its associated family of equivalence classes. For example, suppose $p(1), p(2), \ldots, p(P)$ represent the I/O pins, where associated with a pin $p(i)$ is a family of equivalence classes $F(1)$. As a specific example, the family of equivalence classes $F(1)$ associated with pin $p(1)$ may be a first equivalence class $\{M(0), M(1), M(2), \ldots, M(K)\}$ and a second equivalence class $\{M(L), M(L+1), M(L+2), \ldots, M(L+L0)\}$. In this example, the mapping configuration 114 includes data structures representing the family of configuration sets: $\{p(1), F(1)\}, \{p(2), F(2)\}, \ldots, \{p(P), F(P)\}$.

Accordingly, a configuration set identifies an I/O pin and its associated family of equivalence classes. In some cases, a family of equivalence classes associated with an I/O pin may consist of one equivalence class. For each I/O pin, there is an associated family of equivalence classes, where each memory instance in some equivalence class has a same leaf cell connected to its associated I/O pin. All equivalence classes cover the set of all memory instances. A set of base memory instances is obtained by selecting from each equivalence class a memory instance. In a sense, a base memory instance is representative of the equivalence class from which it was selected from the point of view of pin-based noise characterization.

The information contained in the memory instance list for noise characterization 166 is also present in the mapping configuration 114 for embodiments in which the mapping configuration 114 comprises configuration sets (I/O pins with their associated family of equivalence classes). Accordingly, for such embodiments it could be considered redundant to provide the memory instance list for noise characterization 166. However, for ease of discussion it is convenient to refer to the memory instance list for noise characterization 166 as an object separate from the mapping configuration 114.

A memory compiler analyzes the list of base memory instances for noise characterization 116, where a rigorous pin-based noise analysis is performed for each base memory instance. Because the size of the list of base memory instances (which is the total number of distinct equivalence classes) is expected to be substantially smaller than the entire set of all memory instances, there are savings in computational resources when compared to performing a rigorous pin-based noise analysis on each possible memory instance. Performing a pin-based noise analysis for each base memory instance coupled with the information provided by the mapping configuration 114 provides a procedure for generating a noise database for all memory instances in a computationally efficient manner, as will now be described with respect to FIG. 2.

Figure 2:
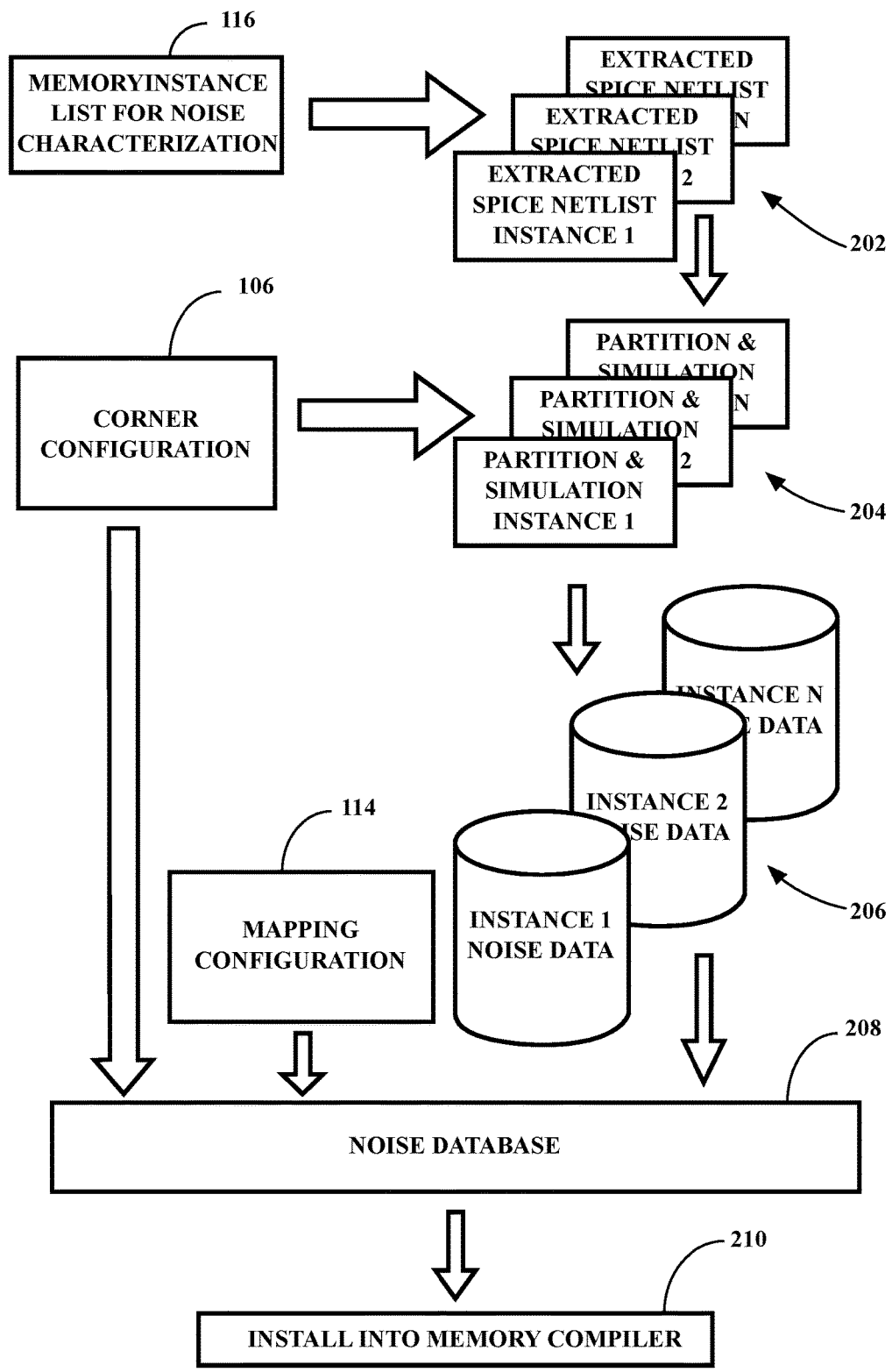
FIG. 2 illustrates a method for providing a noise database.

FIG. 2 illustrates a method for providing a noise database according to one or more embodiments described herein. From the base memory instances provided by the memory instance list for noise characterization 116, a set of netlists 202 is extracted, one netlist for each base memory instance. The netlists may be, for example, according to a SPICE (Simulation Program with Integrated Circuit Emphasis) model. Cuts (partitions) are made to each netlist according to their I/O pins, followed by pin-based noise simulation (characterization) with corner information provided by the corner configuration 106. This process of netlist cutting and pin-based noise simulation is illustrated by the simulation process 204, leading to a set of base memory instance noise data 206.

Pin-based noise characterization may be, for example, based upon the Composite Current Source (CCS) noise model. The CCS noise model is a standard module provided with the open-source Liberty model. In pin-based CCS noise modeling for an I/O pin, a channel-connected block is identified for the I/O pin. For some embodiments, CCS noise modeling is applied to the first stage of the channel-connected block for the case in which the I/O pin is an input pin, or is applied to the last stage of the channel-connected block for the case in which the I/O pin is an output pin, where the remaining circuit components are treated as a black box for purposes of noise modeling.

Tiling together leaf cell instances may be viewed as re-using leaf cells, where because of this re-use the first stage channel-connected circuit and last stage channel-connected circuit for some I/O pin are constant for a relatively large set of memory instances even though a memory circuit view may vary significantly from memory instance to memory instance.

A channel-connected block is also referred to as a channel-connected component. A channel-connected block may be viewed as a set of interconnected transistors with three types of external connections: inputs feeding only into gate terminals of transistors in the channel-connected block; outputs feeding only into gate terminals of transistors in other channel-connected blocks; and connections to a power rail or ground. The first stage of a channel-connected block may be viewed as those transistors in the channel-connected block having a gate connected directly to the input pin, as well as the power or ground connected transistors connected to such transistors. A similar definition may be given to the last stage of a channel-connected block, but where the transistors having an output node connected to the I/O pin are the transistors of interest. Such definitions for a channel-connected block or stage within a channel-connected block may be according guidelines provided by Liberty Technical Advisory Board (LTAB). However, various embodiments described herein are not tied to any one particular noise model or any one particular definition of a channel-connected block or stage, but make use of noise characterization applied to the I/O pins and their respective proximal circuit components.

The pin-based noise characterization applied to the set of base memory instance noise data 206 may also be used for the other memory instances provided by the mapping configuration 114 because of the shared leaf cell instances. That is, the results of the pin-based noise characterization for a base memory instance can be applied to the set of memory instances to which the base memory instance is mapped (associated) without having to re-calculate a pin-based noise characterization for each memory instance. Thus, for some supplied corner data provided by the corner configuration 106, and for the leaf cell extractions 110, a noise database 208 is generated that is applicable to all memory instances, which then may be installed into a memory compiler 210.

Figure 3:
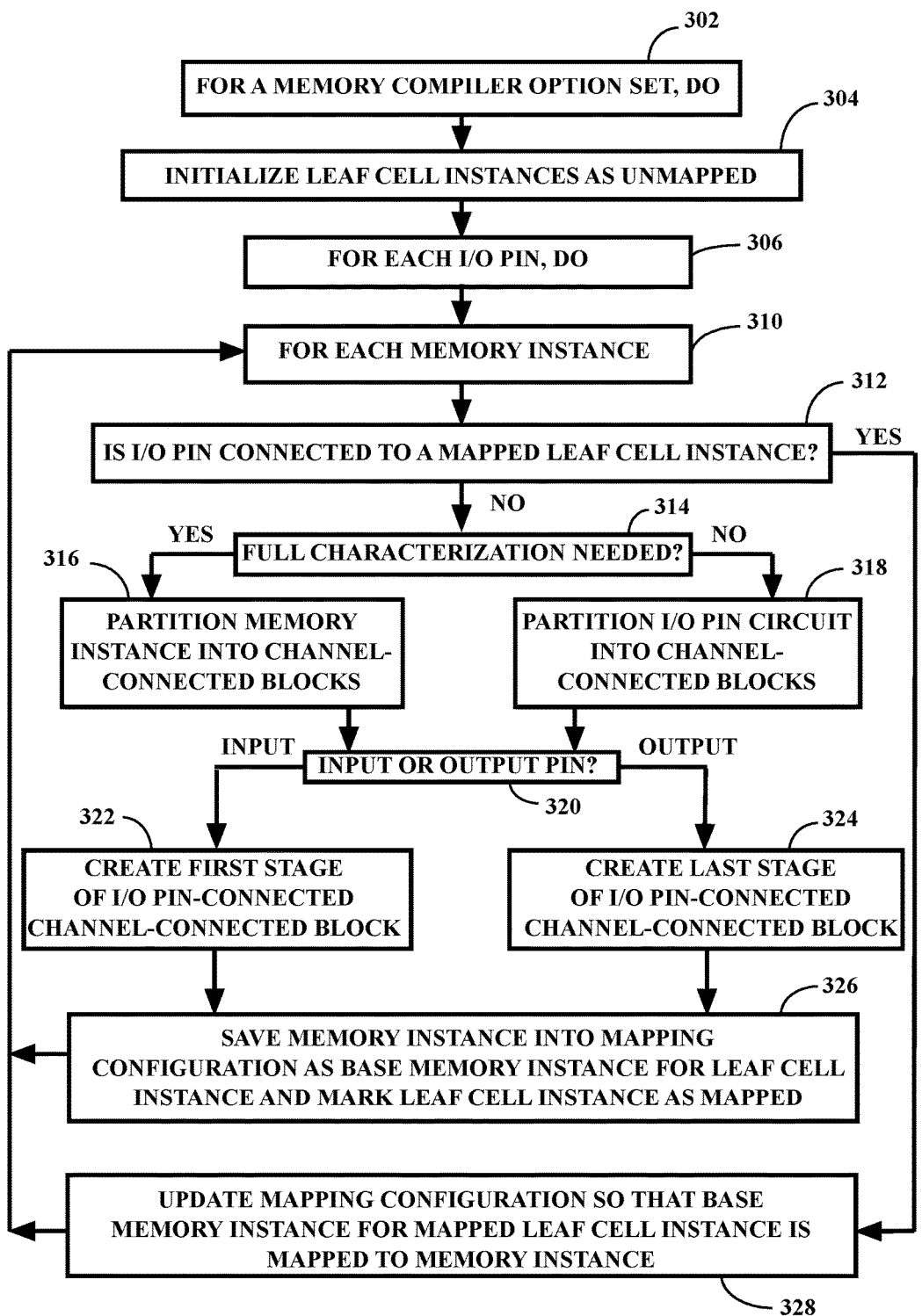
FIG. 3 illustrates a method for generating a mapping configuration and a memory instance list for noise characterization.

FIG. 3 illustrates a method for generating the mapping configuration 114 and the memory instance list for noise characterization 166 according to one or more embodiments. A user provides a memory compiler option set in step 302, where the steps following step 302 are performed for each particular memory compiler option set for which noise characterization is desired. In step 304, each leaf cell instance is initialized as unmapped. The steps following step 306 are performed for each I/O pin for which noise characterization is desired. It is assumed that for proper noise characterization, each I/O pin should be characterized. In step 310, the steps to follow are performed for each memory instance that can be synthesized according to the memory compiler option set specified in step 302.

For the particular I/O pin selected in step 306 and for the particular memory instance selected in step 310, in step 312 a determination is made as to whether the selected I/O pin is connected to a leaf cell instance that has previously been marked as mapped. If the leaf cell instance has not been marked, then in step 314 a determination is made as to whether a full circuit characterization is needed. In the context of step 314, a characterization refers to whether the memory instance selected in step 310 has been partitioned into its respective channel-connected blocks. If a full characterization is needed, then in step 316 the memory instance is partitioned into channel-connected blocks, such as for example according to guidelines provided by LTAB. If a full characterization is not needed, then in step 318 the circuit components to which the I/O pin is connected are partitioned into a channel-connected block.

After step 316 or step 318 has been performed, in step 320 a determination is made as to whether the I/O pin selected in step 306 is an input pin or an output pin. If the I/O pin is an input pin, then in step 322 a data structure is created representing a first stage of the channel-connected block to which the I/O pin is connected; whereas if the I/O pin is an output pin, then in step 324 a data structure is created representing a last stage of the channel-connected block to which the I/O pin is connected.

In step 326, the current memory instance selected in step 310 is stored in a data structure representing the mapping configuration 114, where the selected memory instance is now referred to as a base memory instance as discussed with respect to FIG. 1. In the method illustrated in FIG. 3, the base memory instance is associated with the current leaf cell instance under consideration in step 312, and the current leaf cell instance is marked as mapped.

If in step 312 it is determined that the selected I/O pin is connected to a leaf cell instance that has previously been mapped, then the method proceeds to step 328. In step 328 the data structure representing the mapping configuration 114 is updated to reflect that the base memory instance associated with the current leaf cell instance under consideration in step 312 should be mapped (associated) to the current memory instance selected in step 310.

Performing either of steps 326 or 328 leads to a next iteration of step 310, whereby another memory instance for the I/O pin selected in step 306 is selected (assuming that there is another memory instance) and the steps following step 310 are followed again. If all memory instances for the I/O pin have been considered, then the method returns to step 306 whereby another I/O pin (assuming there is one) is selected. In this way, a data structure representing the mapping configuration 114 comprising the equivalence classes as discussed with respect to FIG. 1 is iteratively built up for each I/O pin selected in step 306 and each memory instance selected in step 310.

Figure 4:
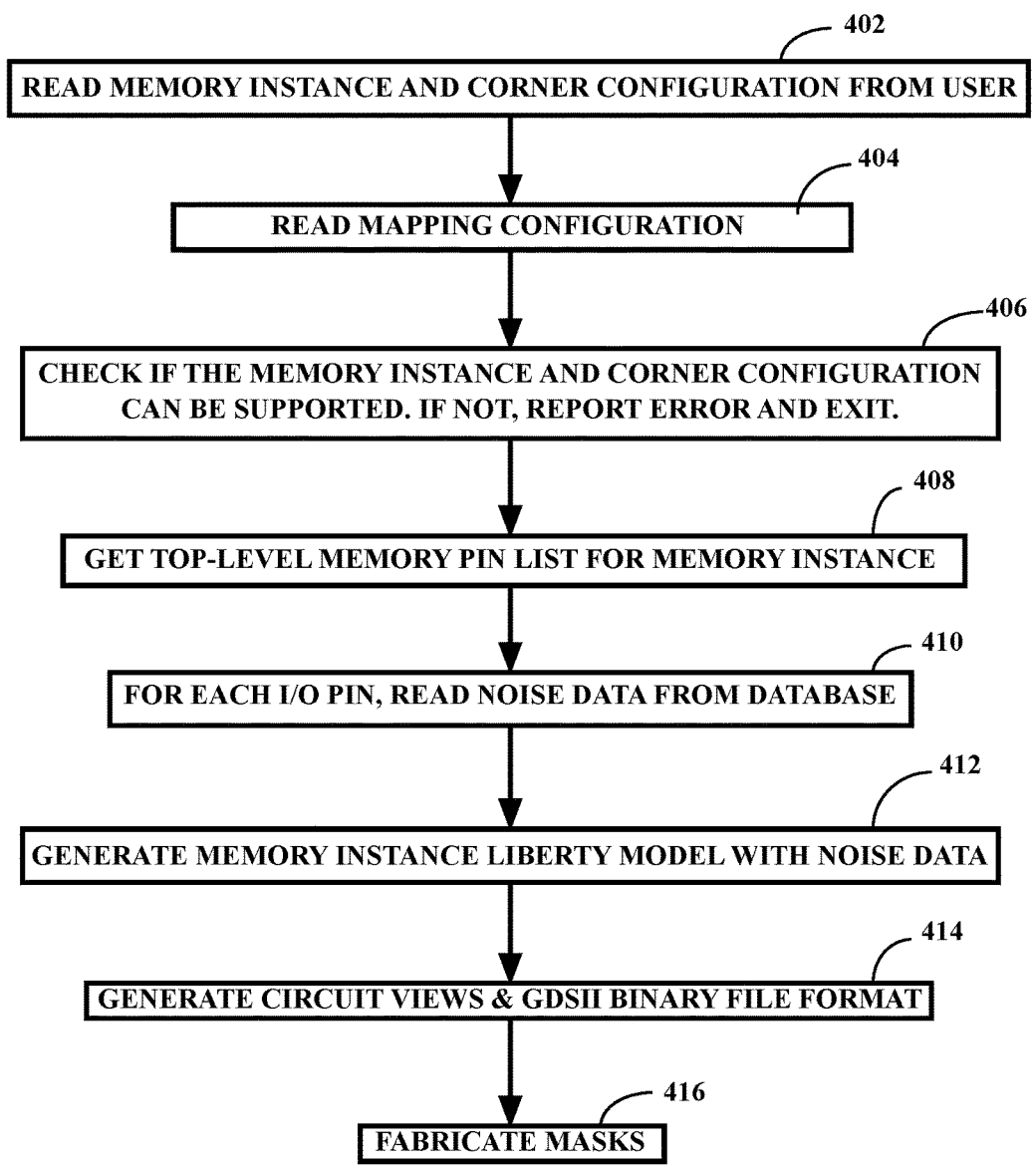
FIG. 4 illustrates a procedure for memory circuit design utilizing the procedures outlines in the previous figures.

FIG. 4 illustrates a procedure for memory circuit design according to one or more embodiments. A user provides a memory instance and corner configuration in step 402, and in step 404 the mapping configuration 114 is read. In step 406 a check is performed to determine if the particular memory instance and corner configuration can be supported by the procedure, and if not, an error report is generated followed by an exit from the procedure. In step 408 a top-level memory pin list is obtained for the memory instance, where in step 410 the noise data from the noise database 208 is read for each I/O pin. In step 412 the liberty model is used to generate the noise data for the memory instance, and various circuit views and files are provided in step 414, for example a GDSII (Graphic Data System II) binary file.

For ease of illustration, FIG. 4 illustrates only some of the steps normally executed in a circuit design flow, such steps being well known to those of ordinary skill in the art of circuit design. For example, the memory circuit view and files provided by a memory compiler may be part of a larger circuit or a block that will be part of a system-on-chip (SOC). Step 416 represents that at some point in the design flow, a file, such as a GDSII binary file, is provided to a mask maker so that various lithography masks can be manufactured and provided to a foundry for chip fabrication.

Figure 5:
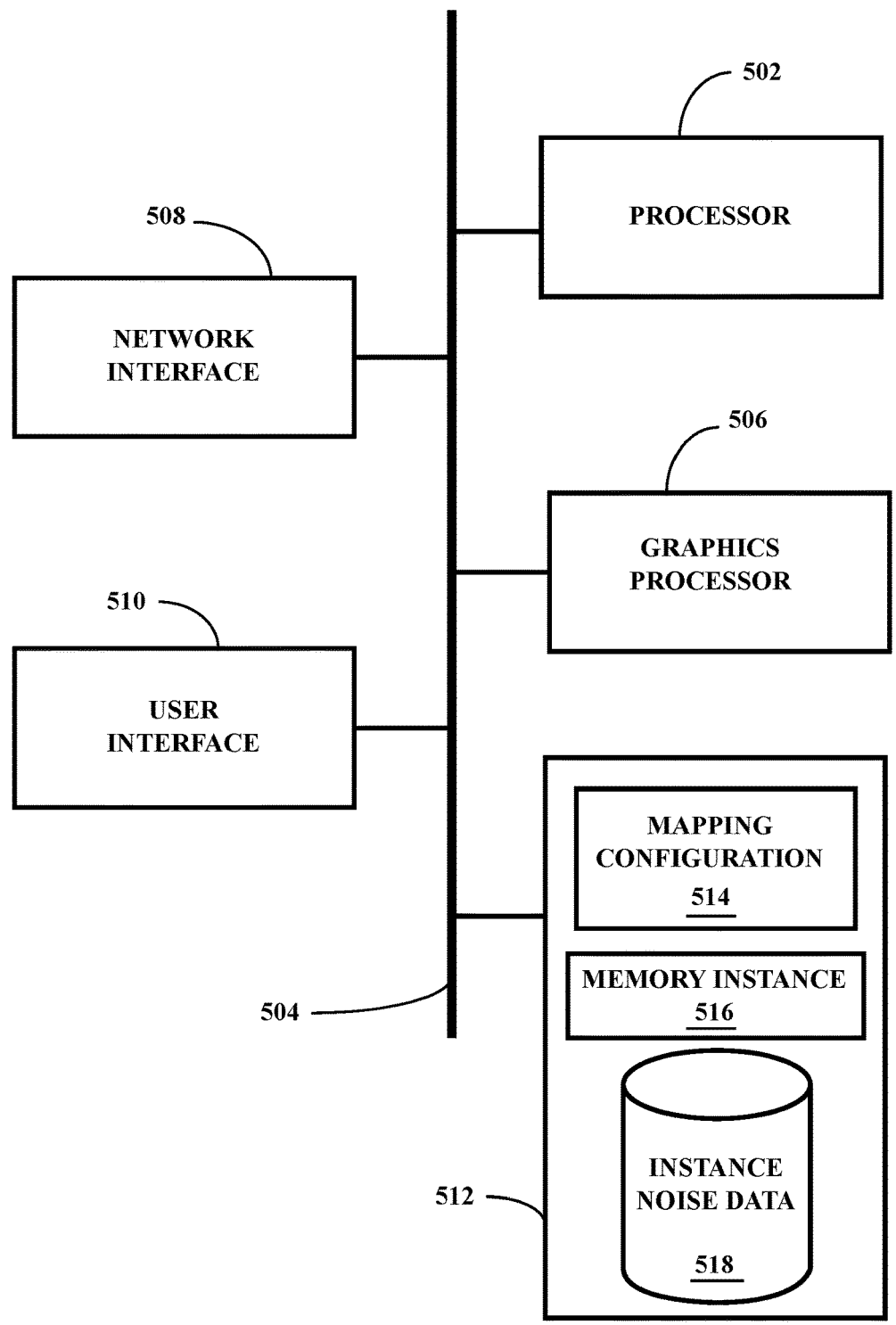
FIG. 5 illustrates a computing platform to implement the procedures and data structures described with respect to the previous figures.

FIG. 5 illustrates a computing platform to implement the procedures and data structures described with respect to the previous figures. For ease of illustration, not all functional modules of a typical computing platform are shown. A processor 502 is coupled to other modules by way of a bus 504. The processor 502 may represent multiple processors, or a single chip with one or more processor cores. In some implementations, an interconnect fabric may replace or be used in conjunction with the bus 504 for the processor 502 to communicate with other functional units. Such functional units include a graphics processor 506, a network interface functional unit 508, a user interface functional unit 510, and a memory 512. The memory 512 represents a memory hierarchy with various levels of memory. Some of these memory levels may include caches integrated with the processor 502, on chips coupled to the processor 502 by way of the bus 504 or interconnect, or memory levels coupled to the computing platform by way of the network interface functional unit 508.

The processor 502 executes code stored in the memory 512 to implement the procedures described with respect to the previous figures to generate the mapping configuration 114, the memory instance list for noise characterization 116, and the noise database 208, as well as the circuit views and binary files generated by a memory compiler. Various data structures for representing the mapping configuration 114, the memory instance list for noise characterization 116, and the noise database 208 are represented within the memory 512 and labeled, respectively, as 514, 516, and 518.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
generating a set of circuit instances based upon an option set for a circuit;
for each I/O pin of the circuit, generating a family of equivalence classes from the set of circuit instances, where each circuit instance in an equivalence class in the family has a same leaf cell connected to each I/O pin;
for each I/O pin of the circuit, selecting one circuit instance from each equivalence class in the family associated with each I/O pin to generate a set of base circuit instances;
performing pin-based noise characterization of each base circuit instance; and
for each base circuit instance, using the pin-based noise characterization of each base circuit instance to noise characterize each circuit instance in the equivalence class from which each base circuit instance was selected.

2. The method as set forth in claim 1, further comprising:
generating a noise database for the set of circuit instances based on the pin-based noise characterization of each base circuit instance.

3. The method as set forth in claim 1, wherein the pin-based noise characterization of each base circuit instance is performed based upon a process, voltage, and temperature (PVT) corner.

4. The method as set forth in claim 3, wherein the circuit is a memory circuit.

5. The method as set forth in claim 3, further comprising:
fabricating a lithography mask based on at least one circuit instance in the set of circuit instances.

6. The method as set forth in claim 3, wherein the pin-based noise characterization of each base circuit instance is based upon the Composite Current Source (CCS) noise model.

7. The method as set forth in claim 6, further comprising:
for each I/O pin and each base circuit instance associated with each I/O pin:
partitioning a leaf cell instance in each base circuit instance that is connected to each I/O pin into a channel-connected block;
basing the pin-based noise characterization of each base circuit instance on a first stage in the channel-connected block for each base circuit instance if each I/O pin is an input pin; and
basing the pin-based noise characterization of each base circuit instance on a second stage in the channel-connected block for each base circuit instance if each I/O pin is an output pin.

8. A method, comprising:
generating a set of circuit instances based upon an option set for a circuit;
generating a set of base circuit instances as a proper subset of the set of circuit instances;
performing pin-based noise characterization of each base circuit instance;
generating a data structure including a noise database for the set of circuit instances based on the pin-based noise characterization of each base circuit instance in an equivalence class from which each base circuit instance was selected.

9. The method as set forth in claim 8, further comprising:
for each base circuit instance, associating a subset of the set of circuit instances;
wherein generating the noise database for the set of circuit instances comprises using the pin-based noise characterization for each base circuit instance to generate pin-based noise characterization of its associated subset of the set of circuit instances.

10. The method as set forth in claim 8, wherein generating the set of base circuit instances comprises:
for each I/O pin of the circuit, selecting circuit instances from the set of circuit instances such that no two selected circuit instances have a same leaf cell instance connected to each I/O pin;
wherein for all I/O pins all the selected circuit instances generate the set of base circuit instances.

11. The method as set forth in claim 10, further comprising:
for each base circuit instance, associating a subset of the set of circuit instances by selecting those circuit instances in the set of circuit instances for which the I/O pin associated with each base circuit instance is connected to a same leaf cell;
wherein generating the noise database for the set of circuit instances comprises using the pin-based noise characterization for each base circuit instance to generate pin-based noise characterization of its associated subset of the set of circuit instances.

12. The method as set forth in claim 11, wherein the circuit is a memory circuit.

13. The method as set forth in claim 11, further comprising:
fabricating a lithography mask based on at least one circuit instance in the set of circuit instances.

14. The method as set forth in claim 11, wherein the pin-based noise characterization is based upon the Composite Current Source (CCS) noise model.

15. An apparatus, comprising:
a memory to store instructions; and
a processor coupled to the memory that when executing the stored instructions:
generates a set of circuit instances based upon an option set for a circuit;
generates a set of base circuit instances as a proper subset of the set of circuit instances;
performs pin-based noise characterization of each base circuit instance; and
generates a noise database for the set of circuit instances based on the pin-based noise characterization of each base circuit instance.

16. The apparatus as set forth in claim 15, the processor when further executing the stored instructions:
for each base circuit instance, associates a subset of the set of circuit instances;
wherein when generating the noise database for the set of circuit instances, uses the pin-based noise characterization for each base circuit instance to generate pin-based noise characterization of its associated subset of the set of circuit instances.

17. The apparatus as set forth in claim 15, the processor when further generating the set of base circuit instances:
for each I/O pin of the circuit, selects circuit instances from the set of circuit instances such that no two selected circuit instances have a same leaf cell instance connected to each I/O pin;
wherein for all I/O pins, all the selected circuit instances are used by the processor to generate the set of base circuit instances.

18. The apparatus as set forth in claim 17, the processor when further executing the stored instructions:
for each base circuit instance, associates a subset of the set of circuit instances by selecting those circuit instances in the set of circuit instances for which the I/O pin associated with each base circuit instance is connected to a same leaf cell;
wherein when generating the noise database for the set of circuit instances the processor uses the pin-based noise characterization for each base circuit instance to generate pin-based noise characterization of its associated subset of the set of circuit instances.

19. The apparatus as set forth in claim 18, wherein the circuit is a memory circuit, the processor when further executing the stored instructions:
generates, based upon the noise database, a noise model inside a Liberty view of a given memory instance and for a given process, voltage, and temperature (PVT) corner.

20. The apparatus as set forth in claim 18, wherein the pin-based noise characterization is based upon the Composite Current Source (CCS) noise model.

* * * * *